(12) United States Patent
Strasman et al.

(10) Patent No.: US 8,706,894 B1
(45) Date of Patent: Apr. 22, 2014

(54) SYSTEM AND METHOD FOR PROVIDING CONTENT TO A USER

(75) Inventors: Nery Strasman, Ramat Gan (IL); John Reister, Palo Alto, CA (US); Asi Elad, Neve Monoson (IL); Amit Eshet, Kiryat-Tivon (IL); Omri Tal, Tel Aviv (IL); Gilat Avieli, Jerusalem (IL)

(73) Assignee: ARRIS Solutions, Inc., Suwanee, GA (US)

( * ) Notice: Subject to any disclaimer, the term of this patent is extended or adjusted under 35 U.S.C. 154(b) by 1116 days.

(21) Appl. No.: 11/691,543

(22) Filed: Mar. 27, 2007

Related U.S. Application Data

(60) Provisional application No. 60/744,145, filed on Apr. 3, 2006.

(51) Int. Cl.
*G06F 15/16* (2006.01)

(52) U.S. Cl.
USPC .............. 709/231; 709/219; 725/95; 370/390

(58) Field of Classification Search
USPC .......... 709/219, 231, 201, 238; 370/401, 350, 370/535, 486, 390; 713/163; 725/112, 95; 705/14; 455/503; 715/210
See application file for complete search history.

(56) References Cited

U.S. PATENT DOCUMENTS

| | | | | |
|---|---|---|---|---|
| 6,397,230 | B1* | 5/2002 | Carmel et al. | 715/210 |
| 6,704,576 | B1* | 3/2004 | Brachman et al. | 455/503 |
| 7,191,332 | B1* | 3/2007 | Pankajakshan et al. | 713/163 |
| 7,281,058 | B1* | 10/2007 | Shepherd et al. | 709/238 |
| 7,548,962 | B2* | 6/2009 | Weber et al. | 709/219 |
| 2002/0016736 | A1* | 2/2002 | Cannon et al. | 705/14 |
| 2002/0107969 | A1* | 8/2002 | Waldvogel et al. | 709/231 |
| 2002/0143852 | A1* | 10/2002 | Guo et al. | 709/201 |
| 2006/0039388 | A1* | 2/2006 | Shur et al. | 370/401 |
| 2007/0121629 | A1* | 5/2007 | Cuijpers et al. | 370/390 |
| 2007/0130601 | A1* | 6/2007 | Li et al. | 725/112 |
| 2007/0274281 | A1* | 11/2007 | Frandsen et al. | 370/350 |

* cited by examiner

*Primary Examiner* — Jungwon Chang
(74) *Attorney, Agent, or Firm* — Troy A. Van Aacken

(57) ABSTRACT

A system, method and a computer-readable medium having a computer-readable code embodied therein for providing content to a user, the method includes: generating, by a media provider, an instruction to fulfill a preliminary condition for receiving a second media conveying stream; transmitting the instruction to the user while also sending a first multicast media conveying stream; waiting for a preliminary condition fulfillment time period to lapse from an end of the transmitting of the instruction; and transmitting, by the media provider, the second media conveying stream towards the user, wherein the transmitting is initiated without being aware of an exact timing of a fulfillment of the preliminary condition.

22 Claims, 5 Drawing Sheets

SYSTEM AND METHOD FOR PROVIDING CONTENT TO A USER

RELATED APPLICATION

This application claims the priority of U.S. provisional patent application Ser. No. 60/744,145 filing date Apr. 3, 2006.

FIELD OF THE INVENTION

The invention relates to methods and systems for providing content to a user and especially to inserting content to be sent to a user.

BACKGROUND OF THE INVENTION

Information can be transmitted over modern networks in various manners. Information can be sent to all members of a network ("broadcast"), to a group of users that joined a multicast group of users ("multicast"), or to a specific user ("unicast").

Internet Protocol (IP) multicast is a technique for many-to-many communication over an IP infrastructure. This is usually used for one-to-many communication. It conforms to a larger receiver population while not requiring prior knowledge of the identity of the receivers or the number of receivers. Multicast utilizes network infrastructure efficiently by requiring the source to send a data packet only once, even if it needs to be delivered to a large number of receivers. The nodes in the network take care of replicating the data packet to reach multiple receivers only where necessary. An IP Multicast group address is used by the sources and the receivers to send and receive content. Sources use the group address as the IP destination address in their data packets. Receivers use this group address to inform the network that they are interested in receiving packets sent to that group. A user joins a multicast group by sending a "join" message, and can leave the multicast group by sending a "leave" message.

The protocol used by receivers to join a group is called the Internet Group Management Protocol or IGMP. Once the receivers join a particular IP Multicast group, a multicast distribution tree is constructed for that group. The multicast distribution tree is updated in response to receiving a "join" message or a "leave" message from the user.

The protocol most widely used for this is Protocol Independent Multicast or PIM. It sets up multicast distribution trees such that data packets sent to a multicast group reach all receivers who have "joined" the group.

On many occasions, television programs (hereinafter—"programs") are conveyed over multicast traffic. Users belonging to the same multicast group receive practically the same copy of the program. In order to receive that program the users must join the relevant multicast group.

Advertisement insertion may require the users to be tuned into other information streams. This tuning can require a different multicast group or may require tuning into another unicast address.

Advertisement insertion is performed by a media provider. In many cases the media provider is not aware of the time of joining of users to multicast groups, and neither are they aware of the time that users leave the multicast groups. These timings are responsive to the time of sending the "join" and "leave" massages, as well as to the time of the actual join and leave actions (especially—the update of the multicast distribution tree). Knowing the timings of join and leave actions are required for providing seamless advertisement insertion.

There is a need to provide systems and methods that can efficiently perform content insertion.

SUMMARY OF THE INVENTION

To be added once claims are approved.

BRIEF DESCRIPTION OF THE DRAWINGS

The abovementioned and other objects, features, and advantages of the present invention will become more apparent from the following detailed description, when applied in conjunction with the accompanying drawings. In the drawings, similar reference characters denote similar elements throughout the different views, in which.

DETAILED DESCRIPTION OF THE DRAWINGS

Media streams can propagate along multiple-purpose networks such as IP networks adapted to convey information of different types (for example—data, video and audio) by being conveyed over information streams. An information stream that conveys media content is referred to as a media conveying stream. A media conveying stream can be a multicast media conveying stream or a unicast media conveying stream. It can also be a broadcast media conveying stream. To simplify explanation, the following descriptions will refer to unicast media conveying streams and multicast media conveying streams. In addition, the methods and systems can perform content insertion other than advertisement insertion. To simplify explanation, the following descriptions refer to an insertion of one or more advertisements to a program.

Figure 1:
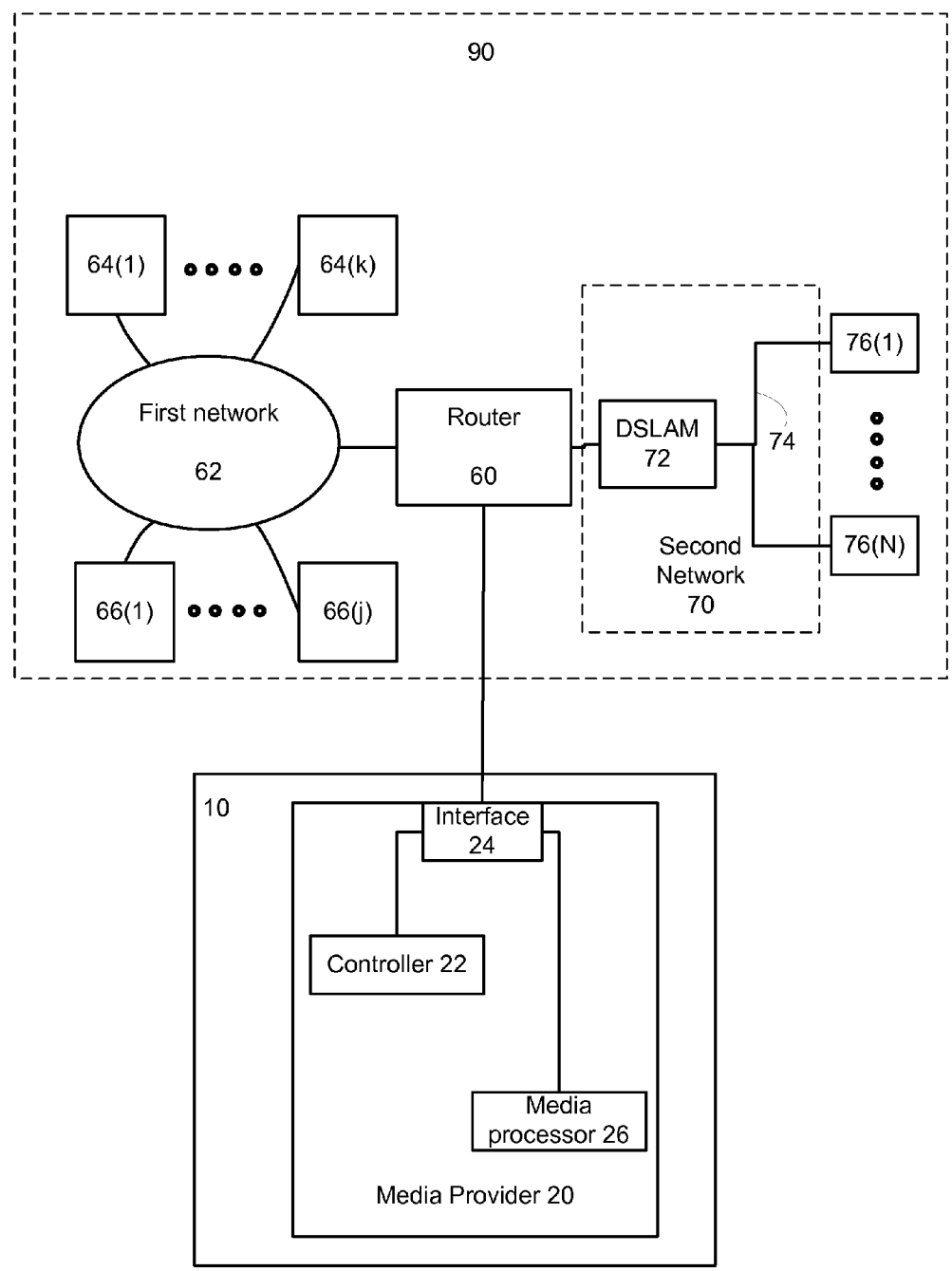
FIG. 1 illustrates a system and its environment, according to an embodiment of the invention.

FIG. 1 illustrates system 10 and its environment 90, according to an embodiment of the invention.

System 10 includes a media provider 20 that is adapted to receive media conveying streams from router 60, to optionally process their media content and then send processed (or unprocessed) media conveying streams to router 60 so that these media conveying streams are received by user such as users 76(1)-76(N). It is noted that media provider 20 can receive media streams or media conveying streams from other sources that are connected to router 60.

Router 60 is connected between first network 62, media provider 20 and second network 70 that in turn is connected to users 76(1)-76(N). Second network 70 includes DSLAM 72 and multiple channels 74 that are connected between DSLAM 72 and users 76(1)-76(N). First network 60 is also connected to multiple program providers 66(1)-66(J) and to multiple advertisement providers 64(1)-64(K).

System 10 includes controller 22, interface 24 and media processor 26. Interface 24 interfaces between system 10 and router 60. Media processor can process media streams that are later outputted from system 10.

Controller 22 is adapted to generate an instruction to fulfill a preliminary condition for receiving a second media conveying stream. Interface 24 is connected to controller 22 and is adapted to send the instruction (generated by controller 22) to the user while sending to the user a first multicast media conveying stream. The first multicast media conveying stream can be received from router 60, can be media processed by media processor 26 (for example by applying rate-shaping) and then transmitted to multiple users via router 60 and second network 70.

System 20 is also adapted to: (i) wait for a preliminary condition fulfillment period to lapse from the end of the instruction transmission; and (ii) transmit the second media conveying stream to the user. System 20 initiates a transmission of the second media conveying stream without being aware of an exact timing of a fulfillment of the preliminary condition.

Figure 2:
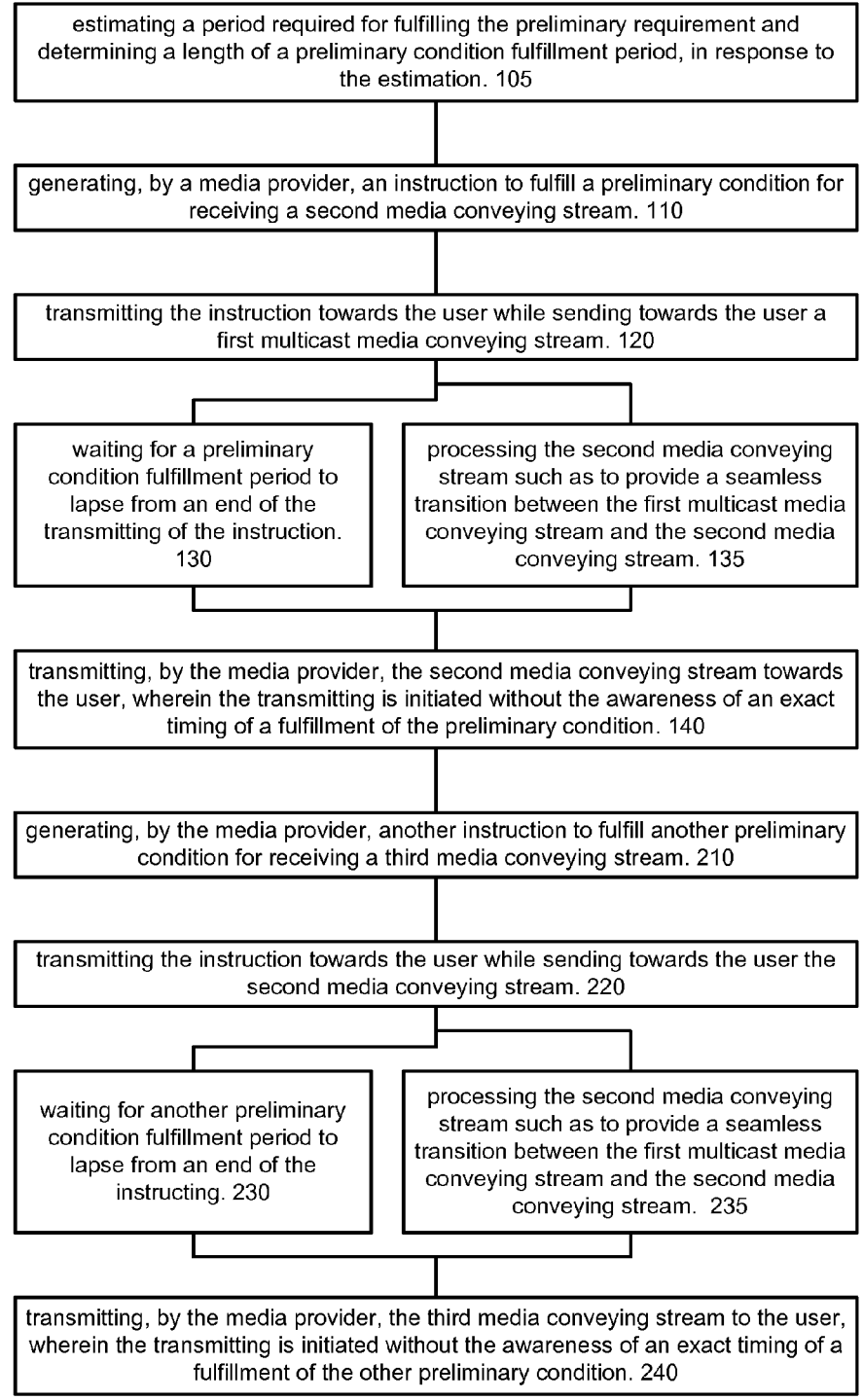
FIG. 2 is a flow chart of a method for providing content to a user, according to another embodiment of the invention.

FIG. 2 is a flow chart of method 100 for providing content to a user, according to another embodiment of the invention.

Method 100 starts by optional stage 105 of estimating a period required for fulfilling the preliminary requirement and determining a length of a preliminary condition fulfillment period, in response to the estimation. It is noted that stage 105 can replace a stage of receiving an estimated period required for fulfilling the preliminary requirement. The estimation can be derivative of the type of the currently provided media conveying stream and the type of media conveying stream that is about to replace the currently provided media conveying stream. For example, if both are multicast streams then the period required for fulfilling the preliminary requirement can be longer than in the case of a transition from a multicast stream to a unicast stream. It is noted that the estimation can be a derivative of the network characteristics, especially response period, network length, number of users connected to the network, number of users belonging to a multicast group. The estimation can be derivative of network statistics, a model of the network, previous join and leave operations, and the like.

Stage 105 is followed by stage 110 of generating, by a media provider, an instruction to fulfill a preliminary condition for receiving a second media conveying stream. The preliminary condition can include tuning into a unicast address and joining a multicast group. Accordingly, the instruction can request a user to be tuned to (to accept) a unicast stream, associated with the second media conveying stream (as illustrated by arrow 204 of FIG. 3) or an instruction to join a multicast group that is destined to receive the second media conveying stream (as illustrated by arrow 224 of FIG. 4, and arrows 244 and 252 of FIG. 5). It is noted that in the latter case, multiple users should receive the instruction. It is noted that the users can be requested to join a multicast group in different points in time so not all the users will request to join the multicast group at once. The timing of join request can be included in the instruction. The users can be asked to join the multicast group in a staggered manner in various other manners. In the former case the instruction is sent to a single user. It is further noted that various stages of method 100 can be executed by system 10 of FIG. 1.

Stage 110 is followed by stage 120 of transmitting the instruction towards the user while sending towards the user a first multicast media conveying stream. Stage 120 can include sending the instruction from the media provider towards the user, wherein the instruction propagates throughout additional network components (such as a router, a DSLAM, one or more channels) before reaching the client. As mentioned above, an instruction to join a multicast group is sent to the user as well as additional users that will form a multicast group.

It is noted that the first multicast media conveying stream is transmitted during a first multicast media conveying period that ends before the second media conveying stream is transmitted to the user. The instruction is sent to the user during this period. The user can receive both the instruction and a fraction of the first multicast media conveying stream simultaneously, but a slight time gap can be introduced without deviating from the scope of the invention.

Stage 120 is followed by stage 130 of waiting for a preliminary condition fulfillment period to lapse from an end of the transmitting of the instruction. Conveniently, stage 130 includes preventing of transmitting media content to the user during the preliminary condition fulfillment period.

Optionally, stage 120 is also followed by optional stage 135 of processing the second media conveying stream such as to provide a seamless transition between the first multicast media conveying stream and the second media conveying stream. This processing can involve applying splicing techniques to insure real time constraints imposed on the transmission of media streams. These constraints can refer to the state of various buffers, decoding continuity, and the like. Stage 135 is followed by stage 140.

Stage 130 is followed by stage 140 of transmitting, by the media provider, the second media conveying stream towards the user, wherein the transmitting is initiated without the awareness of an exact timing of a fulfillment of the preliminary condition. Such a configuration is illustrated in FIG. 1 where router 60 and not media provider 10 receives the join and leave requests (as well as other network related information) from the users. Router 60 can also complete the join or leave operation, but this is not necessarily so and another network component can perform these operations.

Stage 120 can include sending the instruction from the media provider towards the user, wherein the instruction propagates through additional network components (such as a router, a DSLAM, one or more channels) before reaching the client. As mentioned above, an instruction to join a multicast group is send to the user as well as additional users that will form a multicast group. As mentioned above the user can be requested to join the multicast group in different points in time.

Conveniently, various stages of method 100 can be slightly amended and then repeated, thus allowing an insertion of a sequence of different media conveying streams. This sequence can include a sequence of so called back to back advertisements. This is illustrated by stages 210-240.

Figure 4:
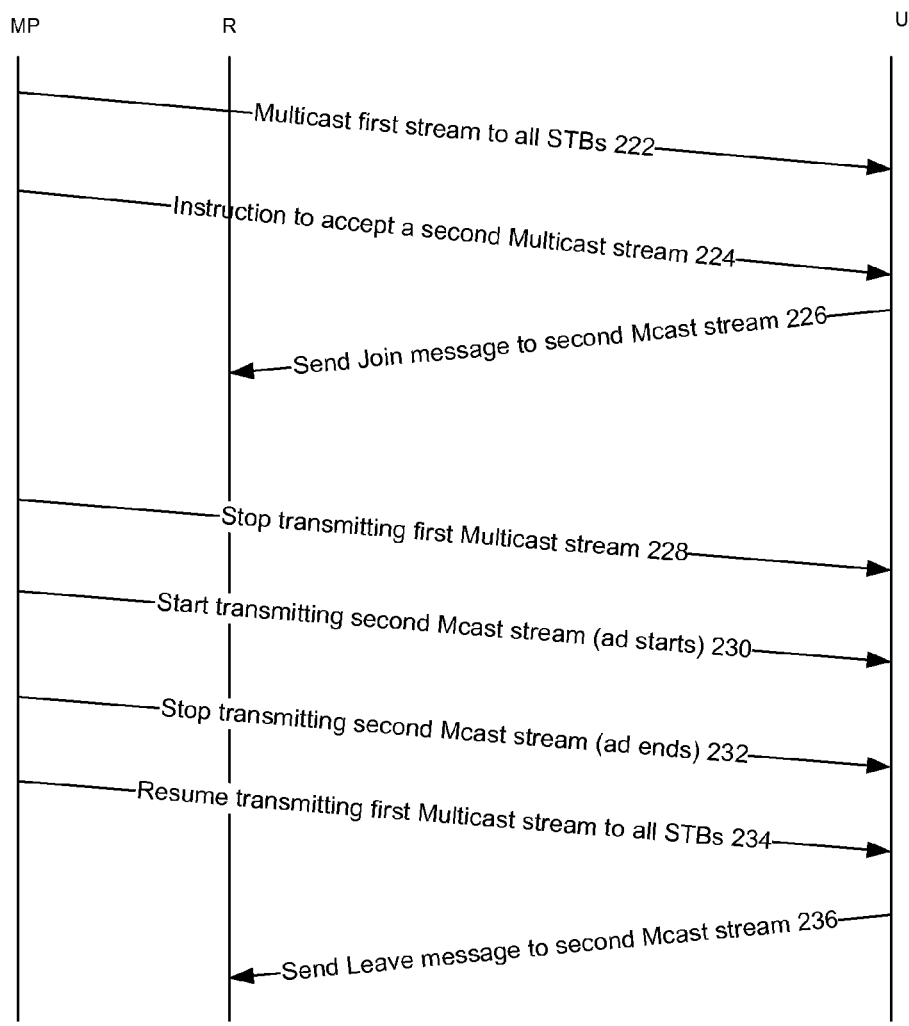
FIG. 4 is a timing diagram illustrating signals sent to and from the user during a content provision process, according to another embodiment of the invention.
Figure 5:
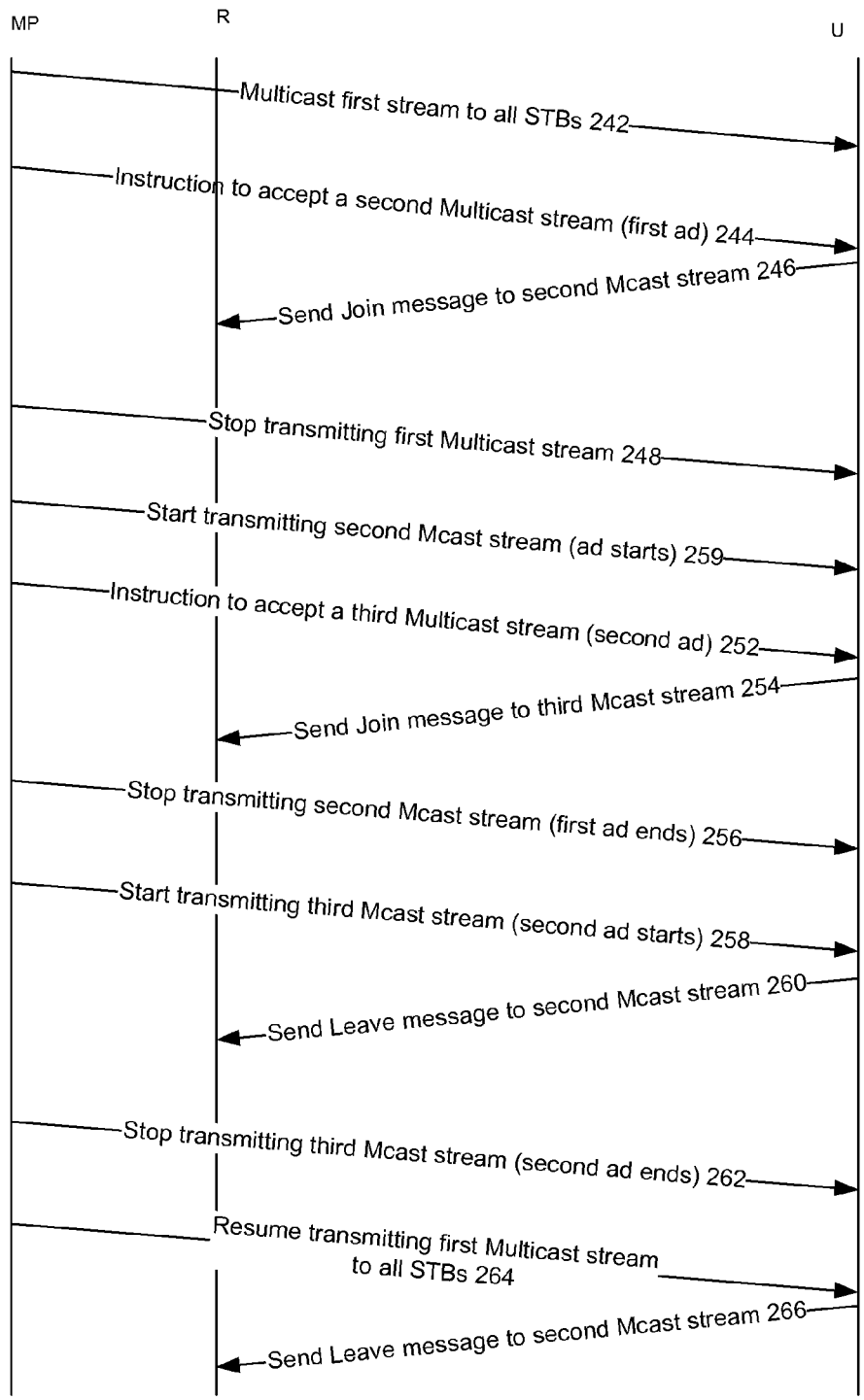
FIG. 5 is a timing diagram illustrating signals sent to and from the user during a content provision process, according to a further embodiment of the invention.

Stage 210 includes generating, by the media provider, another instruction to fulfill another preliminary condition for receiving a third media conveying stream. Conveniently, the second and third media conveying streams are multicast streams and wherein the stage of generating the other instruction comprises generating an instruction to leave a multicast group that receives the second media conveying stream and to join a multicast group that is a destined to receive the third media conveying stream. This situation is illustrated by FIGS. 4 and 5.

Stage 210 is followed by stage 220 of transmitting the instruction towards the user while sending towards the user the second media conveying stream.

Stage 220 is followed by stage 230 of waiting for another preliminary condition fulfillment period to lapse from an end of the instructing.

Optionally, stage 220 is also followed by optional stage 235 of processing the second media conveying stream such as to provide a seamless transition between the first multicast media conveying stream and the second media conveying stream. This processing can involve applying splicing techniques to insure real-time constraints imposed on the transmission of media streams. These constraints can refer to the state of various buffers, decoding continuity, and the like. Stage 235 is followed by stage 240.

Stage 230 is followed by stage 240 of transmitting, by the media provider, the third media conveying stream to the user, wherein the transmitting is initiated without the awareness of an exact timing of a fulfillment of the other preliminary condition.

In general, when multiple media conveying streams should be provided to a user at a sequential manner stages such as 110-140 or 210-240 are repeated for each insertion.

It is noted that either one of the media conveying streams can convey a program or an advertisement. Typically, a transition from a program conveying stream to one or more advertisement conveying streams is followed by a transition back to the program conveying stream.

Figure 3:
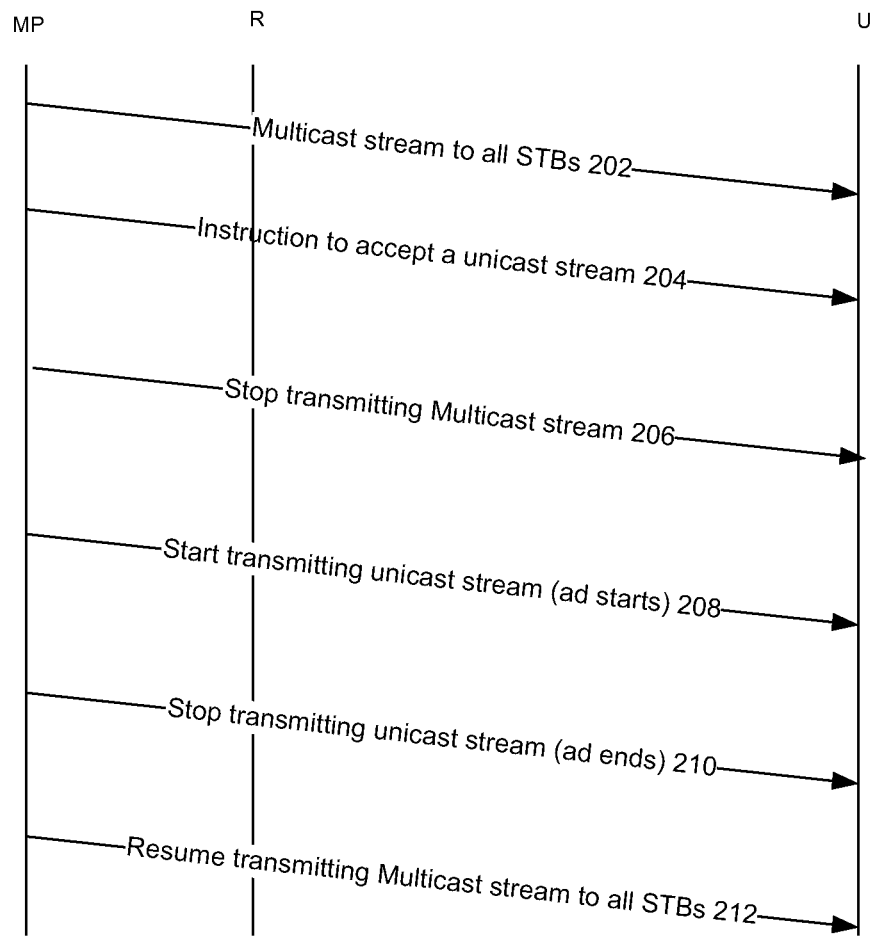
FIG. 3 is a timing diagram illustrating signals sent towards the user during a content provision process according to an embodiment of the invention.

FIG. 3 is a timing diagram illustrating signals 202-212 sent to a user during a content provision process, according to an embodiment of the invention. Table illustrates these signals as well as the source and destination entities of these signals. U represents a user, MP is the media provider and R is the router.

TABLE 1

| Source entity | Target entity | Name of signal in drawing | Remark |
|---|---|---|---|
| MP | U | Multicast stream to all STBs 202 | First multicast media conveying stream is sent to the user as well as other members of the multicast group |
| MP | U | Instruction to accept a unicast stream 204 | Instruction to accept a unicast second media conveying stream. This instruction is sent while the first multicast media conveying stream is being transmitted. |
| MP | U | Stop transmitting multicast stream 206 | No media is transmitted until a preliminary condition fulfillment period lapses |
| MP | U | Start transmitting unicast stream (ad starts) 208 | Transmitting a unicast second media conveying stream that conveys an advertisement. |
| MP | U | Stop transmitting unicast stream (ad ends) 210 | Ending a transmission of a unicast second media conveying stream that conveyed the advertisement. |
| MP | U | Resume transmitting multicast stream to all STBs 212 | Resuming a transmission of the first multicast media conveying stream to the user as well as other members of the multicast group |

FIG. 3 illustrates a scenario in which there is a unique advertisement for each user (viewer). The media provider (also referred to as BigBand device) conditions the media conveying streams so that the end of the first multicast media conveying stream at the time when the advertisement starts is completely adjusted to the beginning of the unicast second media conveying stream; and the end of the unicast second media conveying stream completely adjusted to resume the multicast first media conveying stream. The multicast first media conveying stream and the unicast second media conveying stream are not transmitted concurrently to the user at any time. Conveniently, the media provider may not transmit anything during a short preliminary condition fulfillment period between the two streams.

FIG. 4 is a timing diagram illustrating signals 222-236 sent to a user and from a user during a content provision process according to an embodiment of the invention. Table 2 illustrates these signals as well as the source and destination entities of these signals. U represents a user, MP is the media provider and R is the router. It is noted the instruction to accept a second multicast stream (arrow 224) can include a request to join the appropriate multicast group at different point in time, such as to prevent a large number of user to simultaneously join a certain multicast group. It is noted that some users can join the multicast group at the same point in time, but the number of such users can be limited.

TABLE 2

| Source entity | Target entity | Name of signal in drawing | Remark |
|---|---|---|---|
| MP | U | Multicast first stream to all STBs 222 | Multicast first media conveying stream is sent to the user as well as other members of the multicast group |
| MP | U | Instruction to accept a second multicast stream 224 | Instruction to accept a multicast second media conveying stream. This instruction is sent while the multicast first media conveying stream is being transmitted. |
| U | R | Send join message to second Mcast stream 226 | User sends a "join" message to join a multicast group that is destined to receive the multicast second media conveying stream. |
| MP | U | Stop transmitting first multicast stream 228 | No media is transmitted until a preliminary condition fulfillment period lapses |
| MP | U | Start transmitting second Mcast stream (ad starts) 230 | Transmitting a multicast second media conveying stream that conveys an advertisement. |
| MP | U | Stop transmitting second Mcast stream (ad ends) 232 | Ending a transmission of a multicast second media conveying stream that conveyed the advertisement. |
| MP | U | Resume transmitting first Multicast stream to all STBs 234 | Resuming a transmission of the multicast first media conveying stream to the user as well as other members of the multicast group |
| U | R | Send Leave message to second Mcast stream 236 | User sends a "leave" message to leave a multicast group that is received the multicast second media conveying stream. |

FIG. 3 illustrates a scenario in which multiple users (that form a multicast group) are destined to receive a multicast second media conveying advertisement. This can occur, for example, due to bandwidth constraints that do not allow a transmission of a unicast stream to each user of the group. Alternatively, it can happen when viewers are grouped and more than one of them are intended to view an advertisement. The media provider (also referred to as BigBand device) conditions the media conveying streams so that the end of the multicast first media conveying stream, at the time when the advertisement starts, is completely adjusted to the beginning of the multicast second media conveying stream and the end of the multicast second media conveying stream completely adjusted to the resuming of the multicast first media conveying stream. The multicast first media conveying stream and the multicast second media conveying stream are not transmitted concurrently to the user at any time. Conveniently, the media provider may not transmit anything during a short preliminary condition fulfillment period between the two streams. Also, in some implementations, the user can send a "leave" message for the multicast first media conveying stream when the advertisement begins and send a "join" message to this stream when instructed by the media provider.

FIG. 5 is a timing diagram, illustrating signals sent to and from the user during a content provision process, according to a further embodiment of the invention.

TABLE 3

| Source entity | Target entity | Name of signal in drawing | Remark |
|---|---|---|---|
| MP | U | Multicast first stream to all STBs 242 | Multicast first media conveying stream is sent to the user as well as other members of the multicast group |
| MP | U | Instruction to accept a second multicast stream (first ad) 244 | Instruction to accept a multicast second media conveying stream. This instruction is sent while the multicast first media conveying stream is being transmitted. |
| U | R | Send join message to second Mcast stream 246 | User sends a "join" message to join a multicast group that is destined to receive the multicast second media conveying stream. |
| MP | U | Stop transmitting first multicast stream 248 | No media is transmitted until a preliminary condition fulfillment period lapses |
| MP | U | Start transmitting second Mcast stream (ad starts) 250 | Transmitting a multicast second media conveying stream that conveys an advertisement. |
| MP | U | Instruction to accept a third multicast stream (second ad) 252 | Instruction to accept a multicast third media conveying stream. This instruction is sent while the multicast second media conveying stream is being transmitted. |
| U | R | Send join message to third Mcast stream 254 | User sends a "join" message to join a multicast group that is destined to receive the multicast third media conveying stream. |
| MP | U | Stop transmitting second multicast stream (first ad ends) 256 | No media is transmitted until a preliminary condition fulfillment period lapses |
| MP | U | Start transmitting third Mcast stream (second ad starts) 258 | Transmitting a multicast third media conveying stream that conveys an advertisement. |
| U | R | Send Leave message to second Mcast stream 260 | User sends a "leave" message to leave a multicast group that is received by the multicast second media conveying stream. |
| MP | U | Stop transmitting | Ending a transmission of a multicast third media |

TABLE 3-continued

| Source entity | Target entity | Name of signal in drawing | Remark |
|---|---|---|---|
| | | third Mcast stream (ad ends) 262 | conveying stream that conveyed the second advertisement. |
| MP | U | Resume transmitting first Multicast stream to all STBs 264 | Resuming a transmission of the first multicast media conveying stream to the user as well as other members of the multicast group |
| U | R | Send Leave message to third Mcast stream 266 | User sends a "leave" message to leave a multicast group that is received the multicast third media conveying stream. |

Referring back to FIG. 1, controller 22 can generate an instruction to join a multicast group that is a destined to receive the second media conveying stream. Conveniently, the second media conveying stream is associated with a certain unicast address and controller 22 is adapted to generate an instruction to be tuned to receive the second media conveying stream that is associated with the certain unicast address.

Conveniently, system 10 is adapted to prevent a transmission of media content towards the user during the preliminary condition fulfillment period.

Conveniently, controller 22 is adapted to estimate a period required for fulfilling the preliminary requirement and to determine a length of the preliminary condition fulfillment period in response to the estimation.

Conveniently, system 10 is further adapted to generate another instruction to fulfill another preliminary condition for receiving a third media conveying stream; transmit the instruction to the user while also sending the second media conveying stream; wait for another preliminary condition fulfillment period to lapse from an end of the instructing; and transmit the third media conveying stream to the user, wherein the transmitting is initiated without awareness of an exact timing of a fulfillment of the other preliminary condition.

Conveniently, the second and third media conveying streams are multicast streams and controller 22 is adapted to generate an instruction to leave a multicast group that receives the second media conveying stream and to join a multicast group that is a destined to receive the third media conveying stream.

The invention can be executed by a computer-readable code that includes instructions to execute one or more stages of method 100. The computer-readable code can be stored in a computer readable medium such as but not limited to a disk, a tape, a diskette, a compact disk, a memory unit and the like.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

We claim:

1. A method for providing content to a user, the method comprises:
generating, by a media provider, a first instruction to a user to fulfill by the user a preliminary condition for receiving a second media conveying stream;

transmitting by the media provider the first instruction towards the user while sending by the media provider a first multicast media conveying stream;

waiting for a predetermined preliminary condition fulfillment period to lapse from an end of the transmitting of the instruction;

transmitting, by the media provider, the second media conveying stream towards the user, wherein the transmitting is initiated by the media provider without being aware of an exact timing of a fulfillment of the preliminary condition by the user;

generating, by the media provider, a second instruction operable to fulfill another preliminary condition for receiving a third media conveying stream;

transmitting the second instruction towards the user while sending to the user the second media conveying stream;

waiting for a second preliminary condition fulfillment time period to lapse from an end of the instructing; and transmitting, by the media provider, the third media conveying stream towards the user, wherein the transmitting is initiated without being aware of an exact timing of a fulfillment of the second preliminary condition.

2. The method according to claim 1 wherein the stage of generating the first instruction comprises generating the instruction that is an instruction to join a multicast group that is a destined to receive the second media conveying stream.

3. The method according to claim 1 wherein the stage of generating the first instruction comprises generating the instruction that is an instruction to accept a unicast second media conveying stream, to be tuned to receive the second media conveying stream that is associated with the certain unicast address.

4. The method according to claim 1 wherein the waiting comprises preventing by the media provider transmission of media content to the user during the preliminary condition fulfillment period.

5. The method according to claim 1 further comprising estimating a time period required for fulfilling the preliminary requirement and determining a length of the preliminary condition fulfillment period in response to the estimating.

6. The method according to claim 1 wherein the second and third media conveying streams are multicast streams and wherein, the stage of generating the other instruction comprises generating an instruction to leave a multicast group that receives the second media conveying stream and to join a multicast group that is a destined to receive the third media conveying stream.

7. The method according to claim 1 wherein the transmitting of the second media conveying stream is preceded by a processing the second media conveying stream such as to provide a seamless transition between the first multicast media conveying stream and the second media conveying stream.

8. A non-transitory computer readable medium having a computer-readable code embodied therein for providing content to a user, the computer-readable code comprises instructions for:

generating, by a media provider, a first instruction to a user to fulfill by the user a preliminary condition for receiving a second media conveying stream;

transmitting by the media provider the instruction to the user while also sending by the media provider to the user a first multicast media conveying stream;

waiting for a predetermined preliminary condition fulfillment period to lapse from an end of the transmitting of the instruction;

transmitting, by the media provider, the second media conveying stream towards the user, wherein the transmitting is initiated by the media provider without awareness of an exact timing of a fulfillment of the preliminary condition by the user;

generating, by the media provider, a second instruction operable to fulfill another preliminary condition for receiving a third media conveying stream;

transmitting the second instruction towards the user while sending to the user the second media conveying stream;

waiting for a second preliminary condition fulfillment time period to lapse from an end of the instructing; and transmitting, by the media provider, the third media conveying stream towards the user, wherein the transmitting is initiated without being aware of an exact timing of a fulfillment of the second preliminary condition.

9. A system for providing media, the system comprises a media provider that comprises:

a controller, adapted to generate an instruction to a user to fulfill by the user a preliminary condition for receiving a second media conveying stream;

an interface, coupled to the controller, wherein the interface is adapted to send the instruction to the user while also sending to the user a first multicast media conveying stream;

wherein the media provider is adapted to: wait for a predetermined preliminary condition fulfillment period to lapse from an end of a transmitting of the instruction; and then transmit the second media conveying stream towards the user; wherein the media provider initiates a transmission of the second media conveying stream without being aware of an exact timing of a fulfillment of the preliminary condition by the user;

wherein the media provider is further adapted to: generate another instruction to fulfill another preliminary condition for receiving a third media conveying stream; transmit the instruction to the user, while also sending the second media conveying stream; wait for another preliminary condition fulfillment period to lapse from an end of the instructing; and transmit the third media conveying stream to the user, wherein the transmitting is initiated without awareness of an exact timing of a fulfillment of the other preliminary condition.

10. The system according to claim 9 wherein the controller is adapted to generate the instruction that is an instruction to join a multicast group that is a destined to receive the second media conveying stream.

11. The system according to claim 9 wherein the second media conveying stream is associated with a certain unicast address; and wherein the controller is adapted to generate the instruction that is an instruction to be tuned to receive the second media conveying stream that is associated with the certain unicast address.

12. The system according to claim 9 wherein the media provider is further adapted to prevent transmission of media content to the user during the preliminary condition fulfillment period.

13. The system according to claim 12, wherein the media provider is adapted to prevent the transmission of media content to the user during the preliminary condition fulfillment period in which no media is transmitted to the user by the media provider until the preliminary condition fulfillment period lapses.

14. The system according to claim 9 wherein the controller is adapted to estimate a time period required for fulfilling the preliminary requirement and to determine a length of the preliminary condition fulfillment period in response to the estimation.

15. The system according to claim 9 wherein the second and third media conveying streams are multicast streams and wherein the controller is adapted to generate an instruction to leave a multicast group that receives the second media conveying stream and to join a multicast group that is a destined to receive the third media conveying stream.

16. The system according to claim 9, wherein the controller is adapted to transmit the instruction while sending a first multicast media conveying stream of a television program; and to transmit the second media conveying stream which is a media stream of an advertisement which is not requested for by the user.

17. The system according to claim 9, further comprising a router that is coupled between:
(a) a first network that is coupled to multiple media providers,
(b) the media provider; and
(c) multiple users; wherein the media provider is configured to send the instruction to the user and to transmit media streams to the user through the router; wherein the router and not the media provider receives from the user join and leave requests from the user.

18. The system according to claim 17, wherein the media provider does not receive any information from the user.

19. The system according to claim 9, wherein the media provider is configured to send the instruction to the user and to transmit media streams to the user through a router that is coupled between: (a) a first network that is coupled to multiple media providers, (b) the media provider; and (c) multiple users; wherein the media provider does not receive join and leave requests from the user that are received by the router.

20. The system according to claim 9, wherein the preliminary condition comprises a condition selected from a group consisting of tuning into a unicast address and joining a multicast group.

21. A system for providing media, the system comprises a media provider that comprises:
a controller, adapted to generate an instruction to a user to fulfill by the user a preliminary condition for receiving a second media conveying stream;
an interface, coupled to the controller, wherein the interface is adapted to send the instruction to the user while also sending to the user a first multicast media conveying stream;
wherein the media provider is adapted to: wait for a predetermined preliminary condition fulfillment period to lapse from an end of a transmitting of the instruction; and then transmit the second media conveying stream towards the user; wherein the media provider initiates a transmission of the second media conveying stream without being aware of an exact timing of a fulfillment of the preliminary condition by the user;
wherein the controller is adapted to estimate a time period required for fulfilling the preliminary requirement and to determine a length of the preliminary condition fulfillment period in response to the estimation; and
wherein the controller is adapted to generate multiple instructions to multiple users to fulfill by the users preliminary conditions for receiving the second media conveying stream; wherein the controller is adapted to generate the multiple instructions that comprise timing of join requests and that request different users out of the multiple users to join a multicast group of the second media conveying stream in different points in time, wherein the media provider is further adapted to: wait for a predetermined preliminary condition fulfillment period to lapse from an end of a transmitting of the instructions; and then transmit the second media conveying stream towards the multiple user; wherein the system media provider initiates a transmission of the second media conveying stream without being aware of an exact timing of a fulfillment of the preliminary conditions by the users.

22. A system for providing media, the system comprises a media provider that comprises:
a controller, adapted to generate an instruction to a user to fulfill by the user a preliminary condition for receiving a second media conveying stream;
an interface, coupled to the controller, wherein the interface is adapted to send the instruction to the user while also sending to the user a first multicast media conveying stream;
wherein the media provider is adapted to: wait for a predetermined preliminary condition fulfillment period to lapse from an end of a transmitting of the instruction; and then transmit the second media conveying stream towards the user; wherein the media provider initiates a transmission of the second media conveying stream without being aware of an exact timing of a fulfillment of the preliminary condition by the user;
wherein the controller is adapted to estimate a time period required for fulfilling the preliminary requirement and to determine a length of the preliminary condition fulfillment period in response to the estimation; and
wherein the controller is adapted to estimate the time period required for fulfilling the preliminary requirement further in response to: (a) at least one network characteristics selected from a group consisting of response period and network length, and (b) at least one other parameter selected from a group consisting of network statistics, and a model of the network.

* * * * *